United States Patent [19]

Shimizu et al.

[11] Patent Number: 5,124,090
[45] Date of Patent: Jun. 23, 1992

[54] METHOD FOR THE PREPARATION OF SILICONE GEL SPHERES

[75] Inventors: Koji Shimizu, Ichihara; Mitsuo Hamada, Kisarazu, both of Japan

[73] Assignee: Toray Silicone Company, Ltd., Tokyo, Japan

[21] Appl. No.: 294,243

[22] Filed: Jan. 6, 1989

[30] Foreign Application Priority Data

Jan. 6, 1988 [JP] Japan .................................. 842/63

[51] Int. Cl.⁵ .............................................. B29B 9/00
[52] U.S. Cl. ............................................. 264/13; 425/8
[58] Field of Search ....................... 264/5, 7, 13, 14; 425/6, 8; 428/447

[56] References Cited

U.S. PATENT DOCUMENTS

| 3,143,475 | 8/1964 | Koff et al. | 264/13 |
| 3,242,237 | 3/1966 | Belak et al. | 264/13 |
| 3,437,488 | 4/1969 | Humphreys | 264/13 |
| 3,504,061 | 3/1970 | Elliott | 264/14 |
| 3,663,666 | 5/1972 | Vincent | 264/13 |
| 4,154,714 | 5/1979 | Hockemeyer et al. | 428/447 |
| 4,517,238 | 5/1985 | Mihe et al. | 427/302 |
| 4,824,616 | 4/1989 | Shimizu et al. | 264/7 |

FOREIGN PATENT DOCUMENTS 88-00877 2/1988 European Pat. Off. .............. 264/13
61-223032 10/1986 Japan .

OTHER PUBLICATIONS

Patent Application, Ser. No. 07/200,828, filed Jun. 1, 1988.

Primary Examiner—Jan H. Silbaugh
Assistant Examiner—Mathieu Vargot
Attorney, Agent, or Firm—Roger H. Borrousch

[57] ABSTRACT

Silicone gel spherical particles are prepared by continuously discharging a silicone gel composition into water while continuously moving the discharge nozzle location with respect to the surface of the water.

6 Claims, 1 Drawing Sheet

METHOD FOR THE PREPARATION OF SILICONE GEL SPHERES

BACKGROUND OF THE INVENTION

1. Technical Field

The present invention relates to a method for the preparation of novel silicone gel spheres.

2. Prior Art

A method is known from Japanese Patent Application Laid Open (Kokai) Number 58-163652 (163,652/83) which is equivalent to U.S. Pat. No. 4,517,238, issued May 14, 1985, to Mine et al, for the preparation of silicone gel moldings having an elastomeric or resin surface in which a silicone gel composition is filled into a polyethylene terephthalate container and thermally cured. Curing agent for said silicone gel composition is then applied to the surface of the obtained silicone gel molding, followed by curing. A method is also known from Japanese Patent Application Laid Open Number 61-223032 (223,032/86), published Oct. 3, 1986 and assigned to Shinetsu Polymer Co., Ltd. in which uncured liquid silicone rubber is dripped into a water tank from a stationary cock, and this dripped-in material is cured in the water tank.

The applicants in copending application Ser. No. 200,828, filed Jun. 1, 1988, and assigned to the same assignee as the present application, now U.S. Pat. No. 4,824,616, issued Apr. 25, 1989, describe a method for producing spherical silicone gel particles which have an elastomeric silicone layer on the surface. These particles are prepared by forming the silicone gel particles by dispersing silicone gel composition in water and curing. The silicone gel composition comprises an organopolysiloxane having at least two lower alkenyl groups per molecule, organohydrogenpolysiloxane having at least two SiH groups per molecule, and a platinum catalyst. The surface of the spherical silicone gel particles are then contacted with organohydrogenpolysiloxane and cured to form an elastomeric surface.

PROBLEMS TO BE SOLVED BY THE INVENTION

However, the former method affords relatively large-scale silicone gel moldings, but can give neither small silicone gel particles with a uniform particle size nor approximately truly spherical silicone gel spheres. On the other hand, silicone rubber spheres can be prepared by the latter method. However, when this method is directly applied as a method for the preparation of silicone gel spheres, one finds that the produced silicone gel spheres form adhered agglomerates among adjacent elements due to the tack characteristic of the silicone gel spheres, leading to silicone gel moldings with irregular shapes. Neither small silicone gel particles with a uniform particle size nor approximately truly spherical silicone gel spheres can be obtained.

The present inventors achieved the present invention as the result of extensive research directed at a solution to the aforementioned problems.

SUMMARY OF THE INVENTION

The present invention has as its object the introduction of a highly productive method for the preparation of approximately truly spherical silicone gel spheres.

In a method in which a silicone gel composition is passed from a silicone gel composition reservoir through a nozzle and is continuously dripped into water and cured in the water, the present invention relates to a method for the preparation of silicone gel spheres having the characteristic that the point of entry by said silicone gel composition into the water is displaced by continuously displacing said nozzle over the water's surface.

The present invention relates to a method for the preparation of silicone gel spheres comprising positioning a nozzle above the surface of a body of water, passing silicone gel composition from a reservoir through the nozzle to discharge droplets of the composition into the water while continuously displacing the position of the nozzle relative to the surface of the water at a speed sufficient to prevent sequential droplets from agglomerating in the water, and allowing the droplets to cure in the water before removal therefrom.

DESCRIPTION OF THE PREFERRED EMBODIMENTS

Figure 1:
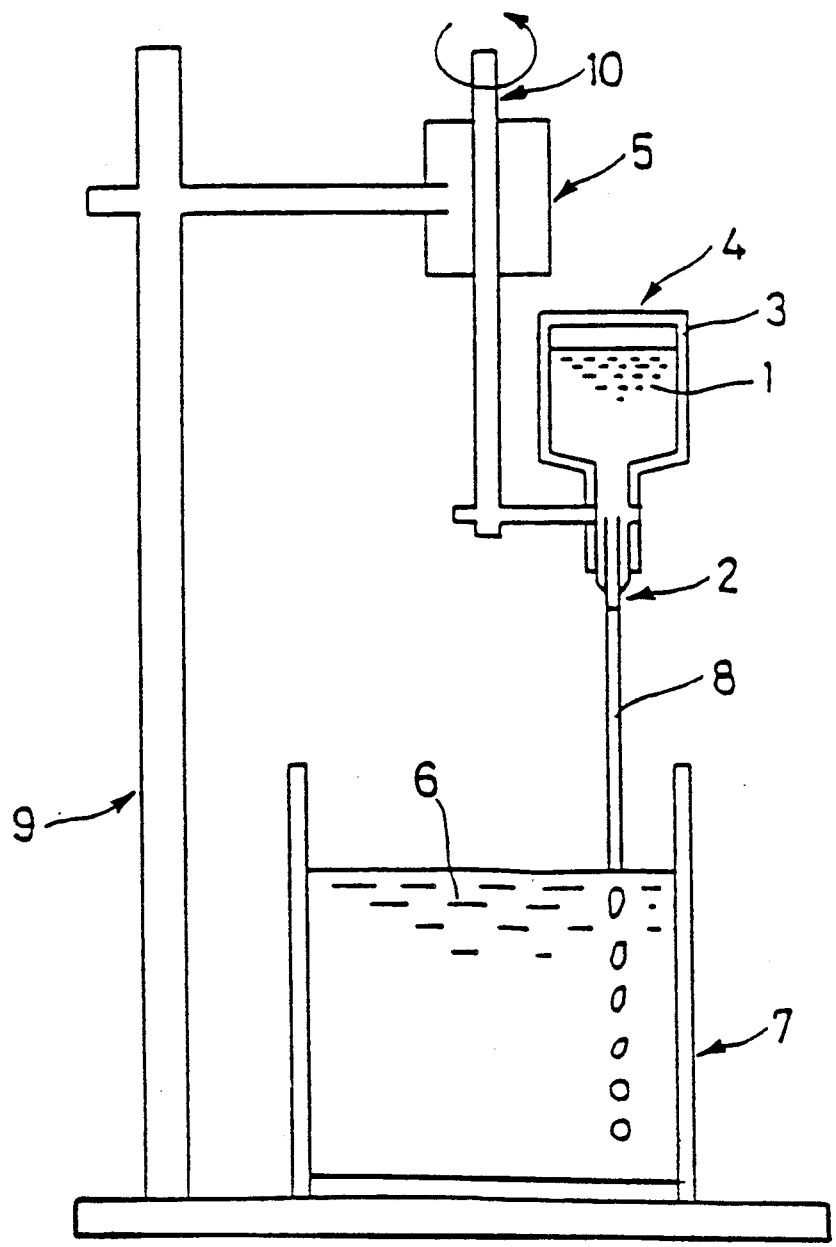
FIG. 1 is a schematic vertical section of a practical implementation of the method of the present invention.
1 = silicone gel composition
2 = extrusion nozzle
3 = cooling jacket
4 = container
5 = motor
6 = water
7 = water tank
8 = silicone gel composition
9 = support
10 = rotating axle

To explain this in greater detail, no specific restriction is placed on the silicone gel composition to be used in the present invention, as long as, it is capable of curing to give a gel-form silicone cured product, that is, a silicone gel.

Silicone gel compositions in this regard comprise addition reaction-curing silicone gel compositions, organoperoxide-curing silicone gel compositions, and condensation reaction-curing silicone gel compositions. The addition reaction-curing silicone gel compositions are preferred among these. An example of an addition reaction-curing silicone gel composition is the silicone gel composition comprising (A) organopolysiloxane having at least 2 lower alkenyl groups in each molecule, (B) organohydrogenpolysiloxane having at least 2 silicon-bonded hydrogen atoms in each molecule, where (A) and (B) are present in such quantities to give a value of 0.1:1 to 1:1 for the molar ratio between the total quantity of silicon-bonded hydrogen atoms of (B) and the total quantity of all lower alkenyl groups in (A), and (C) a platinum compound at 0.1 to 1,000 parts by weight for each 1,000,000 parts by weight of the total quantity of components (A) and (B).

Component (A) is the principal component in the silicone gel, and is an organopolysiloxane having at least two silicon-bonded lower alkenyl groups in each molecule. Lower alkenyl groups in this context are exemplified by vinyl, allyl, and propenyl.

The molecular configuration of the organopolysiloxane of component (A) can be any of straight chain, branch-containing straight chain, cyclic, and network. Furthermore, while its molecular weight is not specifically restricted, viscosities at 25 degrees Centigrade of at least 100 centipoise are preferred in order to obtain a cured product having the form of a silicone gel.

Examples of this component are as follows: methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated dimethylsiloxane-methyl(3,3,3-trifluoropropyl)siloxane copolymers, and polysiloxanes constituted of $CH_2=CH(CH_3)_2SiO_{\frac{1}{2}}$ units, $(CH_3)_3SiO_{\frac{1}{2}}$ units, and $SiO_{4/2}$ units.

Component (B) functions as a crosslinker for component (A), and curing proceeds by the addition reaction of the silicon-bonded hydrogen atoms in this component with the lower alkenyl groups in component (A) under the catalytic activity of component (C). In order to function as a crosslinker, this component (B) must contain at least 2 silicon-bonded hydrogen atoms in each molecule.

There is no specific restriction with regard to the molecular configuration of the organohydrogenpolysiloxane of component (B), and it may be any of straight chain, branch-containing straight chain, cyclic, etc. Furthermore, while its molecular weight also is not specifically restricted, viscosities at 25 degrees Centigrade of 1 to 50,000 centipoise are preferred in order to have a good miscibility with component (A).

Component (B) is to be present in a quantity to give a value of 0.1:1 to 1:1 and preferably 0.3:1 to 0.8:1 for the molar ratio between the total quantity of silicon-bonded hydrogen atoms in component (B) and the total quantity of all lower alkenyl groups in component (A). When the value of this molar ratio falls below 0.1:1, the crosslink density becomes too small and curing will be inadequate. A silicone gel cannot be obtained at values in excess of 1:1.

Examples of this component are as follows: trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers constituted of $(CH_3)_2HSiO_{\frac{1}{2}}$ units and $SiO_{4/2}$ units, and copolymers constituted of $(CH_3)_3SiO_{\frac{1}{2}}$ units, $(CH_3)_2HSiO_{\frac{1}{2}}$ units, and $SiO_{4/2}$ units.

Component (C) is a catalyst for the addition reaction between the alkenyl groups in component (A) and the silicon-bonded hydrogen atoms in component (B). Examples here are chloroplatinic acid and its alcohol and ketone solutions, chloroplatinic acid/olefin complex compounds, chloroplatinic acid/alkenylsiloxane complex compounds, and chloroplatinic acid/diketone complex compounds.

Component (C) should be added at 0.1 to 1,000 parts by weight as platinum metal for each 1,000,000 parts by weight of the total quantity of component (A) plus component (B). The crosslinking reaction will not proceed adequately at below 0.1 part by weight, while exceeding 1,000 parts by weight is uneconomical. The presence of approximately 1 to 100 parts by weight as platinum metal is preferred in typical situations.

Silicone gel compositions used in the present invention may contain filler in order to adjust the fluidity and improve the mechanical properties of the molded product. Such fillers are exemplified by reinforcing fillers such as precipitated silica, fumed silica, calcined silica, and fumed titanium oxide; nonreinforcing fillers such as quartz powder, diatomaceous earth, asbestos, aluminosilicic acid (aluminum silicate), iron oxide, zinc oxide, and calcium carbonate; and such fillers after surface treatment with an organosilicon compound such as hexamethyldisilazane, trimethylchlorosilane, or polymethylsiloxane. Furthermore, in order to retard the curing reaction, small or very small quantities of additives such as acetylenic compounds, hydrazines, triazoles, phosphines, mercaptans, etc., can be added, as long as, the object of the invention is not compromised.

The silicone gel composition can be obtained by simply mixing the above components (A) through (C) by some typical mixing means. However, with regard to mixing and storage, it is preferred that the silicone gel composition be mixed at temperatures falling within the range of minus 60 degrees Centigrade to plus 10 degrees Centigrade and that it be stored at these same temperatures. At below minus 60 degrees Centigrade, the organopolysiloxane comprising component (A) becomes a gel, while the addition reaction between components (A) and (B) proceeds during mixing or storage at above 10 degrees Centigrade. In either case, extrusion of the silicone gel composition from the nozzle becomes difficult, and the shape of the obtained silicone gel becomes nonuniform.

With regard to the reservoir, a receptacle or a container, for the silicone gel composition used in the present invention, no specific restriction pertains here, as long as, the reservoir is capable of temporarily holding the silicone gel composition. Reservoirs in this regard are, for example, metal containers and the kneaders and extruders used for silicone gel compositions or silicone rubber compositions.

With regard to the nozzle to be used in the present invention, this can be any nozzle from which the silicone gel composition can be discharged in a regular or constant configuration. As a general matter, those extrusion nozzles and various cocks are well known for use in the ejection or discharge of liquids can be used. Such a nozzle can be installed in a fixed manner directly on the reservoir, or the nozzle itself can be connected to a flexible, separately movable tube and installed on the container via this.

In the present invention, the silicone gel composition is continuously discharged into the water by passage through the nozzle, and it is essential that this nozzle be in continuous motion relative to the surface of the water. This motion or displacement of the nozzle causes the drip-point or point of entry of the silicone gel composition gel to undergo displacement, and is essential for inhibiting the agglomeration which would occur if the silicone gel composition were discharged in at the same location with respect to the surface of the water and elements of the formed silicone gel composition were in contact during and after curing. The nozzle's direction of motion is not particularly specified, as long as, the discharge point or drip-point or point of entry by the silicone gel composition into the water undergoes displacement with respect to the surface of the water. In order to obtain silicone gel spheres having a uniform sphere size, motion preferably occurs over a level surface at a constant distance from the water surface. A further consideration of the nozzle motion is that when the nozzle is fixed on some device or apparatus, the device or apparatus itself may be set in motion.

The procedure by which the silicone gel composition is passed through the nozzle and discharged or dripped into the water is selected according to the viscosity of the silicone gel composition employed and the desired productivity for the silicone gel spheres. Thus, in the case of the use of a high-viscosity silicone gel composition or a desire to increase the productivity, an effective approach for discharging into the water will be to raise the pressure in the reservoir in order to increase extrusion of the silicone gel composition from the nozzle and to extrude this continuously into the water in thread or ribbon form where it forms spherical particles. In the case of a low-viscosity silicone gel composition, another tactic for dripping into the water is to allow the silicone gel composition to pass through the nozzle and be extruded in thread or liquid droplet form under spontaneous dripping conditions under the effect of its own weight.

The water used in the present invention functions to form and disperse the gel-form silicone spheres by uniformly dispersing the silicone gel composition and contributing to its partial cure. The use of a surfactant in the present invention is preferred in order uniformly to disperse this spherical material. Surfactants usable in this regard are the nonionic and anionic surfactants and emulsifying agents used in the art for the formation of silicone water-based emulsions. While no particular restriction applies here, surfactants which contain atoms which would inhibit the catalytic activity of the platinum compound, for example, the sulfur atom, phosphorus atom, etc., should be avoided due to the resulting inhibition of curing of the liquid silicone gel composition. The temperature of the water in general should be at least 25 degrees Centigrade in order to accelerate curing of the silicone gel composition, and temperatures of at least 50 degrees Centigrade are preferred.

The method of the present invention can produce approximately truly spherical silicone gel spheres with diameters of 0.01 mm to 40 mm. Compared to the fluidity of the above-described silicone gel composition, the silicone gel of the present invention is a cured silicone which manifests deformation and limited fluidity under the application of stress as a consequence of the partial formation of a three-dimensional network structure by crosslinking. The hardness does not exceed 50 using an Asker C hardness tester, and does not exceed zero using a JIS hardness tester.

The silicone spheres prepared by the method of the present invention have the properties of a silicone gel, and can be used as modifying additives for a variety of organic resins, such as epoxies. They can also be used as an anti-vibration material or shock-absorbing or buffering material.

The invention is explained in greater detail by the following illustrative examples which should not be construed as limiting the invention which is properly delineated in the claims. Parts=parts by weight in the reference example and illustrative examples.

REFERENCE EXAMPLE 1

The following ingredients were combined and mixed to prepare a mixture A: 30 parts dimethylvinylsiloxy-terminated dimethylpolysiloxane having a viscosity of 1,000 centipoise (vinyl group content=0.25 weight %), 70 parts dimethylvinyl-siloxy-terminated dimethylpolysiloxane having a viscosity of 500 centipoise (vinyl group content=0.5 weight %), and 1.5 parts trimethylsiloxy-terminated methylhydrogenpolysiloxane having a viscosity of 5 centipoise (silicon-bonded hydrogen atom content =0.8 weight %). A mixture B was then prepared by combining and mixing the following ingredients: 30 parts 1,000 cp dimethylpolysiloxane as described above, 70 parts 500 cp dimethylpolysiloxane as described above, and 0.4 parts isopropanolic chloroplatinic acid solution (platinum metal content=3 weight %).

A silicone gel composition was prepared by feeding mixtures A and B into a static mixer (precooled to minus 10 degrees Centigrade) using a pressure-delivery pump and mixing at a 1:1 weight ratio.

EXAMPLE 1

The method of the present invention is described in the following with reference to the attached FIG. 1. FIG. 1 is a schematic vertical section of a practical implementation of the method of the present invention. The silicone gel composition 1 prepared in Reference Example 1 was filled into a container 4 installed on a rotating axle 10 connected to a motor 5 equipped with an extrusion nozzle 2 (5 mm bore×10 mm) and cooled to 3 degrees Centigrade by means of a cooling jacket 3. While the container 4 was being rotated by motor 5, silicone gel composition 1 was then extruded from extrusion nozzle 2 in thread form toward the surface of water 6 along the perimeter of water drum 7 filled with water 6 held at 85 degrees Centigrade. This extruded silicone gel composition 8, falling above the water surface, was broken up by its entry into the water, and formed spheres while sinking in the water. The now spherical silicone gel composition was cured while resurfacing and floating. The cured product was removed from the water, and the water fraction was removed by drying for 1 hour at 80 degrees Centigrade. The cured product consisted of approximately truly spherical silicone gel spheres having average diameters of 10 mm.

COMPARISON EXAMPLE 1

Silicone gel spheres were prepared as in Example 1 with the modification that the silicone gel composition was extruded in a stationary configuration, without rotation of container 4. The obtained silicone gel spheres formed adhered agglomerates and had irregular shapes, and could no longer be considered as spherical. Furthermore, even when the attempt was made to separate approximately truly spherical silicone gel spheres from these irregularly shaped silicone gel spheres, the individual silicone gel spheres could not be separated.

EXAMPLE 2

Silicone gel spheres were prepared as in Example 1, but using a 10 mm bore×10 mm extrusion nozzle in place of the 5 mm bore×10 mm extrusion nozzle used in Example 1. Approximately truly spherical silicone gel spheres with average diameters of 30 mm were obtained.

EXAMPLE 3

Silicone gel spheres were prepared as in Example 1 with the modification that a 0.25 weight % aqueous solution of surfactant (ethylene oxide adduct of trimethylnonanol, Tergitol TMN-6, nonionic surfactant from Union Carbide Corporation) was used in place of the water employed in Example 1. The obtained silicone gel spheres were approximately truly spherical silicone gel spheres with average diameters of 1.0 mm.

EFFECTS OF THE INVENTION

In a method in which a silicone gel composition is passed from a silicone gel composition reservoir through a nozzle and is continuously discharged into water and cured in the water, because, in the present invention, the point of entry by said silicone gel composition into the water is displaced by continuously displacing said nozzle over the water's surface, the present invention is characterized by the highly productive preparation of approximately truly spherical silicone gel spheres.

That which is claimed is:

1. In a method in which a silicone gel composition is passed from a silicone gel composition reservoir through a nozzle and is continuously dripped into water and cured in the water, the improvement comprising a method for the preparation of silicone gel spheres in which the point of entry by said silicone gel composition into the water is displaced by continuously displacing said nozzle above the water's surface, the silicone gel spheres are cured while resurfacing and floating, and are removed from the water where the silicone gel composition dripped into the water is free of contact with spheres during and after curing.

2. The method for the preparation of silicone gel spheres according to claim 1 in which the silicone gel composition comprises
   (A) organopolysiloxane having at least 2 lower alkenyl groups in each molecule,
   (B) organohydrogenpolysiloxane having at least 2 silicon-bonded hydrogen atoms in each molecule, where (A) and (B) are present in such quantities to give a value of 0.1:1 to 1:1 for the molar ratio between the total quantity of silicon-bonded hydrogen atoms of (B) and the total quantity of all lower alkenyl groups in (A), and
   (C) a platinum compound at 0.1 to 1,000 parts by weight for each 1,000,000 parts by weight of the total quantity of components (A) and (B).

3. A method for the preparation of silicone gel spheres comprising
   positioning a nozzle above the surface of a body of water,
   passing silicone gel composition from a reservoir through the nozzle to discharge droplets of the composition into the water while
   continuously displacing the position of the nozzle relative to the surface of the water at a speed sufficient to prevent sequential droplets from agglomerating in the water,
   allowing the droplets to cure in the water before removal therefrom while resurfacing and floating on the water surface, and
   removing cured silicone gel spheres where the silicone gel composition discharge droplets are free from contact with spheres during and after curing.

4. The method according to claim 3 in which the silicone gel composition comprises
   (A) organopolysiloxane having at least 2 lower alkenyl groups in each molecule,
   (B) organohydrogenpolysiloxane having at least 2 silicon-bonded hydrogen atoms in each molecule, where (A) and (B) are present in such quantities to give a value of 0.1:1 to 1:1 for the molar ratio between the total quantity of silicon-bonded hydrogen atoms of (B) and the total quantity of all lower alkenyl groups in (A), and
   (C) a platinum compound at 0.1 to 1,000 parts by weight for each 1,000,000 parts by weight of the total quantity of components (A) and (B).

5. The method in accordance with claim 3 in which the water contains a surfactant.

6. The method in accordance with claim 4 in which the water contains a surfactant.

* * * * *